United States Patent Office 3,502,644
Patented Mar. 24, 1970

3,502,644
MONO- AND DISAZO DYESTUFFS CONTAINING A DIAZINE OR TRIAZINE GROUP
Horst Nickel and Fritz Suckfull, Leverkusen, Germany, assignors to Farbenfabriken Bayer Aktiengesellschaft, Leverkusen, Germany, a corporation of Germany
No Drawing. Filed June 20, 1966, Ser. No. 558,551
Claims priority, application Germany, June 30, 1965,
F 46,471; Sept. 18, 1965, F 47,242
Int. Cl. C09b 29/30, 33/10; D06p 1/02
U.S. Cl. 260—154                3 Claims

ABSTRACT OF THE DISCLOSURE

Azo dyestuffs of the formula:

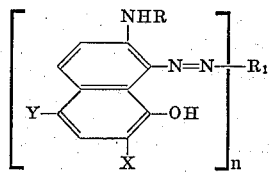

wherein Y stands for sulphonic acid, sulphonamide, or substituted sulphonamide, X stands for hydrogen or sulphonic acid, R stands for hydrogen, alkyl or substituted alkyl, $R_1$ stands for the residue of a diazo or tetrazo compound containing at least one group selected from the class consisting of a sulphone and sulphonic acid, and $n$ stands for the integer 1 or 2; these dyestuffs being particularly useful in dyeing fibrous materials containing hydroxyl or amido radicals, e.g. cellulose, wool, silk, and superpolyamide and the resulting dyeings are characterized by good fastness properties.

---

The present application is concerned with valuable new azo dyestuffs of the formula

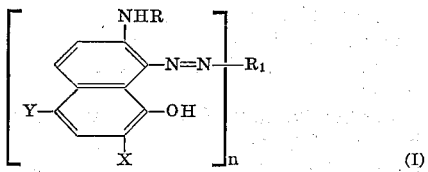

in which Y stands for a sulphonic acid group or an optionally substituted sulphonamide group, X is a hydrogen atom or a sulphonic acid group, R represents a hydrogen atom or an optionally substituted alkyl radical, $R_1$ stands for the radical of a diazo or tetrazo component containing a sulphone group and/or a sulphonic acid group, and $n$ is the number 1 or 2.

A particularly valuable group of dyestuffs within the range of the Formula I corresponds to the formula

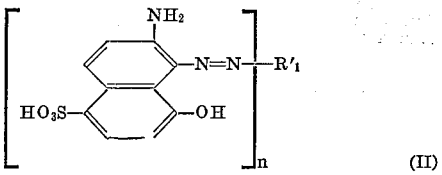

wherein $R'_1$ is the radical of sulphone group- and/or sulphonic acid group-containing diazo component of the benzene or naphthalene series, and $n$ has the same meaning as above.

The new dyestuffs are obtained by combining the diazo compound of an amine of the formula $$R_1\text{—}NH_2$$

in which $R_1$ has the same meaning as above, with 1 mol of a coupling component of the formula

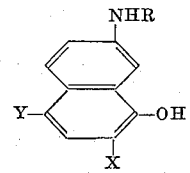

in which R, X and Y have the meaning already given, or by coupling the tetrazo compound of a diamine of the formula $$H_2N\text{—}R_1\text{—}NH_2$$

in which $R_1$ has the same meaning as above, with 2 mol of a coupling component of the Formula III. The coupling is carried out in an acid, preferably aqueous medium and takes place in the peri-position to the hydroxyl group or in the α-position, adjacent to the NHR group, of the naphthalene component (III).

The procedure can also be carried out by using, instead of the diazo compound of an amine of the formula $R_1\text{—}NH_2$, the diazo compound of an amine of the formula $R_2\text{—}NH_2$, in which $R_2$ means an aromatic radical which contains a sulphone and/or a sulphonic acid group and which can be converted into the radical $R_1$, by reactions customary in azo chemistry, such as reduction, hydrolysis, acylation and/or condensation, and then converting the radical $R_2$ into the radical $R_1$ after coupling.

The dyestuffs (II), preferred within the range of the dyestuffs of the Formula I, can be obtained in an analogous manner by coupling the diazo compounds of the above-mentioned amines with 2-amino-8-hydroxy-naphthalene-5-sulphonic acid.

Coupling components of the Formula III which contain only one sulphonic acid group are described, for example, in British patent specification No. 5148 (1894); (cf. N. Donaldson "The Chemistry and Technology of Naphthalene Compounds," p. 323). The 2-amino-8-hydroxynaphthalene-5,7-disulphonic acid can be obtained by sulphonating the 5- or 7-mono-sulphonic acid.

Diazo components $R_1\text{—}NH_2$ suitable for the production of monoazo dyestuffs, in which in Formula I $n$ stands for the number 1, are, for example, 4-amino-4'-acylaminodiphenyl - 3-sulphonic acids (acyl being e.g. acetyl, propionyl, fumaroyl, benzoyl, m- or p-chlorobenzoyl, m- or p-toluyl, m- or p- nitrobenzoyl, m-trifluoromethylbenzoyl, terephthaloyl, isophthaloyl, benzenesulphonyl or a benzenesulphonyl radical substituted in the benzene nucleus), asymmetrical ureas, such as N-phenyl-N',4'-(4-aminodiphenyl - 3 - sulphonic acid)-urea, which may be substituted in the phenyl nucleus for example by chlorine in the p- or m-position, aminophenyl ureas of the formula

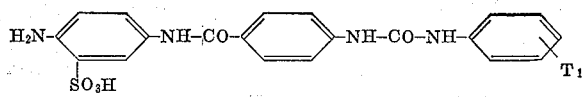

in which $T_1$ means hydrogen or substituents, such as e.g. chlorine.

Amino compounds of the formula

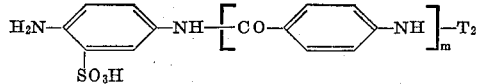

in which $T_2$ may be e.g. a triazinyl radical, a pyrimidyl radical, such as the dichloro-pyrimidyl, trichloro-pyrimidyl or 2 - methyl - sulphonyl - 5-chloro-6-methyl-pyrimidyl radical, furthermore the 2 - methyl - sulphonyl-nicotinoyl radical, the 2,6 - dichloro- or 2,6-dimethyl-sulphonyl-isonicotinoyl radical, the 2,3 - dichloro - quinoxalinoyl-(6)-
or 2,3-dichloro-quinoxaline-6-sulphonyl radical and $m$ is
a number from 0 to 2.

Tetrazo components suitable for the production of polyazo dyestuffs (Formula I, $n=2$) are, for example, 1-amino-4-(4' - aminobenzoylamino)-benzene -2 - sulphonic acid, N,N' - bis-(4 - amino - 3-sulphophenyl)-urea, N,N'-bis - (4' - amino - 3'-sulphodiphenyl-4)-urea, N,N'-bis-(1 - amino - 4 - [4'-aminobenzoylamino]-benzene-2-sulphonic acid-4')-urea, which may be substituted in the benzoyl radical, for example, by alkyl, such as methyl.

Examples of amines of the formula $R_2$–$NH_2$ are:

1-amino-4-nitrobenzene-2-sulphonic acid,
1-amino-4-acylaminobenzene-2-sulphonic acids, such as for example 1-amino-4-acetylaminobenzene-2-sulphonic acid,
   2-sulphonic acid,
1-amino-4-(4'-nitrobenzoyl-amino)-benzene-2-
   sulphonic acid,
1-amino-4-(3'-nitrobenzoyl-amino)-benzene-2-
   sulphonic acid,
1-amino-4-(4'nitro-3'-methylbenzoylamino)-benzene-2-
   sulphonic acid and 1-amino-4-(4'-nitrobenzene
   sulphonamido)-benzene-2-sulphonic acid, furthermore 4-amino-4'-(4''-nitrobenzoylamino)-diphenyl-3-
   sulphonic acid,
4-amino-4'-(3''-nitrobenzoylamino)-diphenyl-3-
   sulphonic acid,
4-amino-4'-(3''-nitro-4''-methylbenzoylamino)-
   diphenyl-3-sulphonic acid,
4-amino-4'-acetylaminodiphenyl-3-sulphonic acid,
2-amino-6-nitro-naphthalene-4,8-disulphonic acid,
4-amino-4'-nitrostilbene-2,2'-disulphonic acid and
4-amino-4'-acetylaminostilbene-2,2'-disulphonic acid.

The new dyestuffs are valuable products which are very well suited for the dyeing and printing of hydroxyl group- and amido group-containing fibre materials, e.g. for the dyeing of natural and regenerated cellulose, wool, silk, superpolyamide fibres and the like. The resulting dyeings, especially those on cellulose fibre materials, are characterised by good fastness properties, particularly very good fastness to light.

In the following examples, which are given for the purpose of illustrating the invention, the parts are parts by weight, if not otherwise stated.

EXAMPLE 1

23.9 parts (0.1 mol) 2-amino-8-hydroxynaphthalene-5-sulphonic acid (prepared according to the instructions of British patent specification No. 5148 [1894] are dissolved neutral in 400 parts water and rendered acidic to Congo with hydrochloric acid. The diazotisation mixture, prepared in the usual manner from 21.8 parts (0.1 mol) 1-amino-4-nitrobenzene-2-sulphonic acid, is added to this suspension at 0° C. and 140 parts by volume of a 20% sodium acetate solution are added dropwise in the course of 90 minutes. When the coupling is completed, the product is salted out with sodium chloride and isolated.

The resulting paste is dissolved neutral in 1000 parts water and mixed at 60° C. with a solution of 42 parts crystallised sodium sulphide in 100 parts water. When the reduction of the nitro group to the amino group is completed, the product is isolated acidic to Congo with sodium chloride and the paste freed from sulphur in the usual manner. Phosgene is then introduced at about 40° C. into the solution of the aminoazo dyestuff, while the mixture is neutralised with a sodium carbonate solution, until the formation of the urea of the formula

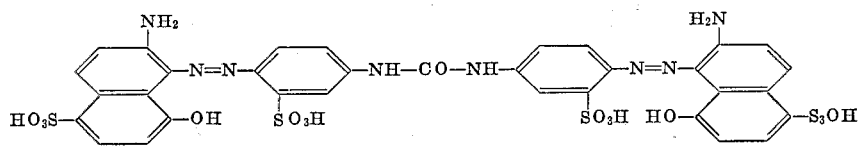

is completed. The dyestuff is salted out, isolated and dried. In the dried state, it is a dark powder which dissolves in water with a red-violet colour. The dyestuff dyes cotton in red-violet shades of very good fastness to light.

If, instead of phosgene, terephthalic acid dichloride or fumaric acid dichloride is used as acylating agent, then dyestuffs are obtained which dye cotton in red-violet shades.

Further dyestuffs of this type are set out in the following table. The amino compound of the diazo radical is given in the first column, the acylating agent in the second column, and the colour shade in the third column.

| Amino compound | Acylating-agent | Shade |
| --- | --- | --- |
| $H_2N$—⟨ ⟩—NH—CO—⟨ ⟩—$NO_2$, $SO_3H$ | Phosgene | Purple. |
| Same as above | 2,3-dichloroquinoxaline-6-carboxylic acid chloride | Red-violet. |
| Do | Phenyl isocyanate | Purple. |
| Do | P-chlorophenyl isocyante | Do. |
| Do | m-Chlorophenyl isocyanate | Do. |
| Do | Fumaric acid dichloride | Do |
| $H_2N$—⟨ ⟩—NH—CO—⟨ ⟩—$NO_2$, $SO_3H$ | Phosgene | Red-violet. |
| $H_2N$—⟨ ⟩—NH—CO—⟨ ⟩($CH_3$)—$NO_2$, $SO_3H$ | do | Purple. |
| $H_2N$—⟨ ⟩—NH—$SO_2$—⟨ ⟩—$NO_2$, $SO_3H$ | do | Red-violet. |

| Amino compound | Acylating-agent | Shade |
|---|---|---|
| H₂N–C₆H₃(SO₃H)–CH=CH–C₆H₃(SO₃H)–NH₂ | ....do.... | Do. |
| H₂N–C₆H₃(SO₃H)–NH–CO–C₆H₄–NO₂ (2:1) | Cyanuric chloride | Do. |
| Same as Above | Cyanuric chloride plus 3. N-methylaniline | Do. |
| H₂N–C₆H₃(SO₃H)–NH–CO–C₆H₄–NO₂ (1:1) | Cyanuric chloride plus 2. p-sulphanilic acid plus 3. aniline | Do. |
| Same as above | Cyanuric chloride plus 2. p-sulphanilic acid plus 3. N-methylaniline | Do. |

EXAMPLE 2

31.9 parts (0.1 mol) 2-amino-8-hydroxynaphthalene-5,7-disulphonic acid (prepared by sulphonating 2-amino-8-hydroxynaphthalene-5- or -7-sulphonic acid in sulphuric acid 66° Bé. at 60° C.) are dissolved neutral in 350 parts water, the solution is rendered acidic with acetic acid, combined with the diazotisation mixture of 0.1 mol 1-amino-4-(4′-nitrobenzoylamino)-benzene-2-sulphonic acid at 0° C., 350 parts by volume of a 20% sodium acetate solution are added dropwise and 350 parts by volume pyridine added. When the coupling is completed, the dyestuff is isolated acidic to Congo, redissolved, if desired, in a soda-alkaline medium, and isolated.

The resulting paste is dissolved neutral in 1500 parts water and mixed at 55 to 60° C. with a solution of 36 parts crystallised sodium sulphide in 100 parts water. When the reduction of the nitro group to the amino group is completed, the product is worked up in the usual manner and the aminoazo dyestuff isolated. The dyestuff paste is dissolved in 2500 parts of warm water; phosgene is passed into the solution at 50 to 55° C., while neutralising with a sodium carbonate solution until the formation of the urea of the formula

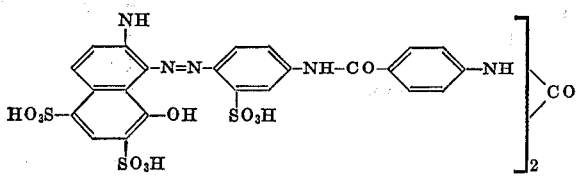

is completed. The dyestuff is isolated in the usual manner and dried. In the dry state it is dark powder which dissolves in water with a red-violet colour. The dyestuff dyescotton in red-violet fast shades.

If, instead of the above diazo component, the equivalent quantity of the aminodiphenyl compound of the formula

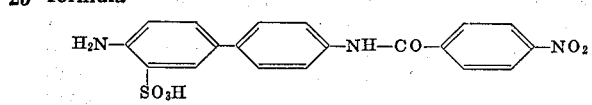

is used, then a disazo urea dyestuff is obtained which dissolves in water with a purple colour.

EXAMPLE 3

23.9 parts (0.1 mol) 2-amino-8-hydroxynaphthalene-5-sulphonic acid are dissolved neutral in 400 parts water, rendered acidic to Congo with a little hydrochloric acid and mixed at 0° C. with a diazotisation mixture prepared from 0.1 mol acetylbenzidine monosulphonic acid of the formula

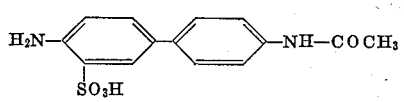

280 parts by volume of a 20% sodium acetate solution are added dropwise and the mixture is stirred until the coupling is completed. The precipitated couplings product is filtered off with suction and dried. A dyestuff obtained which dissolves in water with a red-violet colour.

If other diazo components are used, instead of acetylbenzidine-monosulphonic acid, monoazo dyestuffs are obtained which are set out in the following table:

| Structure | Shade |
|---|---|
| H₂N–C₆H₃(SO₃H)–C₆H₄–NH–CO–NH–C₆H₅ | Red-violet. |
| H₂N–C₆H₃(SO₃H)–NH–CO–C₆H₄–NH–CO–NH–C₆H₅ | Purple. |
| H₂N–C₆H₃(SO₃H)–NH–CO–C₆H₄–NH–CO–NH–C₆H₄–Cl | Do. |
| H₂N–C₆H₃(SO₃H)–NH–CO–C₆H₄–NH–CO–NH–C₆H₄–Cl | Do. |
| H₂N–C₆H₃(SO₃H)–NH–CO–C₆H₄–NH–CO–(dichlorotriazinyl) | Red-violet. |

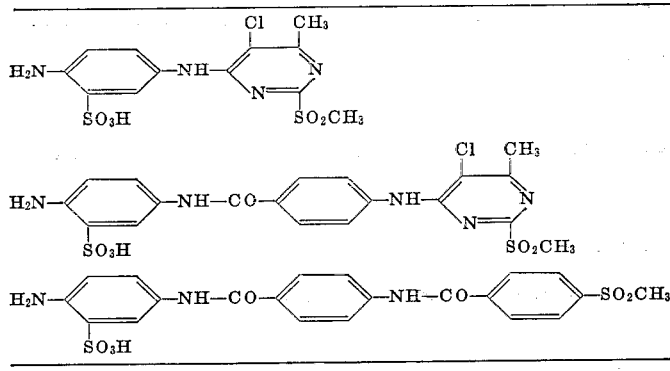

Do.

Do.

Do.

EXAMPLE 4

A solution of 23.9 parts (0.1 mol) 2-amino-8-hydroxy-naphthalene-5-sulphonic acid in 400 parts water is acidified with acetic acid (pH 4.5), combined at 5 to 10° C. with the tetrazotisation mixture prepared in the usual manner from 0.05 mol 1-amino-4-(4'-aminobenzoylamino)-benzene-2-sulphonic acid, and 500 parts by volume of a 20% sodium acetate solution are added dropwise. When the coupling is completed, the product is salted out with sodium chloride and isolated. The dried dyestuff is a dark powder which dissolves in water with a red-violet colour.

Further dyestuffs which are produced by coupling with tetrazo components are set out in the following table:

We claim:
1. An azo dyestuff of the formula:

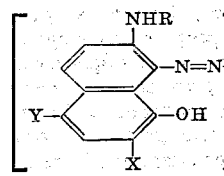

wherein Y is sulphonic acid or sulphonamide, X is hydrogen or sulphonic acid, R is hydrogen, $n$ is the integer 1 or 2, and $R_1$, when $n$ is 1, is unsubstituted sulfobenzene or sulfobenzene substituted by one or more members from the group consisting of:

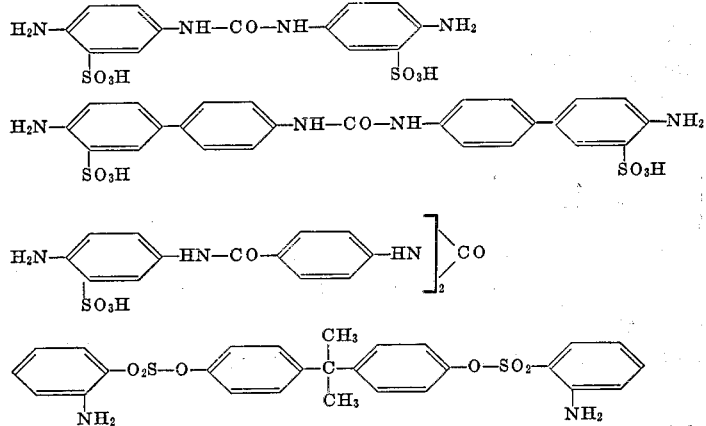

Red-violet.

Do.

Purple.

Red (wool).

EXAMPLE 5

A soultion of 0.1 mol of the dyestuff of the formula

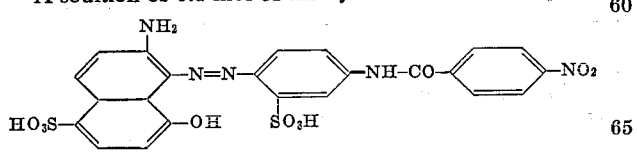

(prepared by coupling, in an acetic acid medium, diazotised 1-amino-4-(4'-nitrobenzoylamino) - benzene - 2-sulphonic acid with 2-amino-8-hydroxynaphthalene-5-sulphonic acid) in 5500 parts by volume water is mixed at 50° C. with a solution of 17.3 parts glucose in 100 parts water and 410 parts of a 40% sodium hydroxide solution and stirred until the joint reduction of two molecules to the azo and azoxy compound, respectively, is completed. The dyestuff obtained is salted out with sodium chloride and isolated. It dissolves in water with a red-violet colour.

(1) nitro and
(2) amino compounds of the formula:

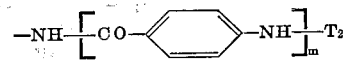

wherein $m$ is 0 or 1, and $T_2$ is dichloropyrimidinyl, trichloropyrimidinyl 2-methylsulfonyl nicotinoyl, 2,6-dichloroisonicotinoyl, 2,6-dimethylsulfonyl isonicotinoyl, 2,3 - dichloroquinoxaline-6-carbonyl, 2,3-dichloroquinoxaline-6-sulfonyl, 2-p-sulfoanilino-4-anilino-1,3,5-triazin-6-yl, or 2-p-sulfoanilino-4-N-methylanilino-1,3,5-triazin-6-yl; and $R_1$, when $n$ is 2, is

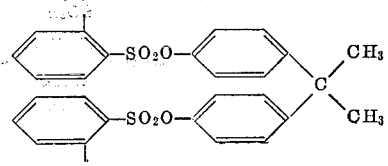

2. The dyestuff of claim 1 of the formula:
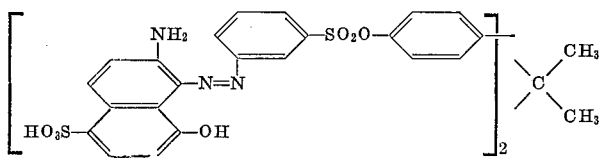
3. The dyestuff of claim 1 of the formula
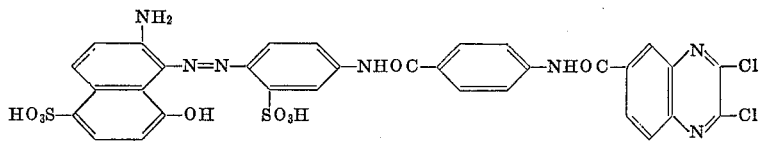
References Cited
UNITED STATES PATENTS
| | | | |
|---|---|---|---|
| 687,171 | 11/1901 | Ulrich et al. | 260—175 |
| 1,173,077 | 2/1916 | Ackermann | 260—175 |
| 1,901,515 | 3/1933 | Hentrick et al. | 260—199 |
| 2,053,817 | 9/1936 | Felix et al. | 260—199 XR |
| 2,077,854 | 4/1937 | Richard | 260—199 |
| 3,002,964 | 10/1961 | Keller et al. | 260—187 |
| 3,125,562 | 3/1964 | Ammann et al. | 260—154 XR |
| 3,211,554 | 10/1965 | Dreyfus | 260—175 XR |
FLOYD D. HIGEL, Primary Examiner
U.S. Cl. X.R.
260—153, 187, 553, 175, 507, 256.4, 250, 295, 456

UNITED STATES PATENT OFFICE
CERTIFICATE OF CORRECTION

Patent No. 3,502,644  Dated March 24, 1970

Inventor(s) Horst Nickel, et al.

It is certified that error appears in the above-identified patent and that said Letters Patent are hereby corrected as shown below:

| Column | Line | Error |
|---|---|---|
| 3 | 18 | "2-sulphonic acid" should be deleted |
| 7 | Table last formula | " " <br> —CO—⟨phenyl⟩—SO2CH3 | should read ---

Signed and Sealed

SEP 29 1970

(SEAL)
Attest:

Edward M. Fletcher, Jr.
Attesting Officer

WILLIAM E. SCHUYLER, JR.
Commissioner of Patents